US008076278B2

(12) United States Patent
Abbas et al.

(10) Patent No.: US 8,076,278 B2
(45) Date of Patent: Dec. 13, 2011

(54) SELF ADHESIVE HARD SURFACE CLEANING COMPOSITION

(75) Inventors: Syed Husain Abbas, Willimantic, CT (US); Daniele Del Fiol, Casalpusterlengo (IT); Andrew Stephen Jamieson, Bebington (GB); Serena Pezzia, Casalpusterlengo (IT); Ivana Trombetta, Casalpusterlengo (IT)

(73) Assignee: Conopco, Inc., Englewood Cliffs, NJ (US)

( * ) Notice: Subject to any disclaimer, the term of this patent is extended or adjusted under 35 U.S.C. 154(b) by 55 days.

(21) Appl. No.: 12/595,684

(22) PCT Filed: Mar. 27, 2008

(86) PCT No.: PCT/EP2008/053637
§ 371 (c)(1),
(2), (4) Date: Dec. 3, 2009

(87) PCT Pub. No.: WO2008/125451
PCT Pub. Date: Oct. 23, 2008

(65) Prior Publication Data
US 2010/0130399 A1 May 27, 2010

(30) Foreign Application Priority Data
Apr. 16, 2007 (EP) .................................... 07106225

(51) Int. Cl.
*C11D 17/00* (2006.01)

(52) U.S. Cl. ........ 510/191; 510/192; 510/382; 510/504; 510/505; 510/506; 510/473

(58) Field of Classification Search .................. None
See application file for complete search history.

(56) References Cited

U.S. PATENT DOCUMENTS

| 4,308,025 | A | 12/1981 | Hussamy |
| 4,490,280 | A | 12/1984 | Joshi et al. |
| 5,703,025 | A | 12/1997 | Zyngier et al. |
| 6,297,205 | B1 | 10/2001 | Saxena et al. |
| 6,310,015 | B1 | 10/2001 | Diez et al. |
| 6,667,287 | B2 | 12/2003 | Aszman et al. |
| 2002/0132743 | A1 | 9/2002 | Saito et al. |
| 2003/0035049 | A1 | 2/2003 | Dickens et al. |
| 2003/0166480 | A1 | 9/2003 | Sachdev et al. |
| 2008/0190457 | A1* | 8/2008 | Veltman et al. ............ 134/22.19 |

FOREIGN PATENT DOCUMENTS

| DE | 26 02 514 A1 | 7/1976 |
| EP | 586 137 B1 | 3/1994 |
| EP | 0 619 366 | 10/1994 |

(Continued)

OTHER PUBLICATIONS

Co-pending application for: Abbas et al.; U.S. Appl. No. 12/595,691, filed Jan. 16, 2010, entitled: Toilet Cleaning Block.

(Continued)

*Primary Examiner* — Necholus Ogden, Jr.
(74) *Attorney, Agent, or Firm* — Michael P. Aronson

(57) ABSTRACT

The present invention relates to hard surface cleaning compositions, and their use. It is an object of the present invention to provide a hard surface cleaning composition providing hygiene to a hard surface, whilst being easily positioned onto a hard surface; even a wet surface. The present invention provides a hard surface cleaning composition, which is at least partially transparent or translucent, characterized in that it comprises a surfactant system forming a liquid crystalline phase in the presence of water and biocide material.

11 Claims, 1 Drawing Sheet

FOREIGN PATENT DOCUMENTS

| | | |
|---|---|---|
| EP | 553 162 B1 | 12/1994 |
| EP | 0 791 047 | 5/1999 |
| EP | 1 086 199 A1 | 12/1999 |
| EP | 1 416 225 | 5/2004 |
| GB | 1 364 460 A | 8/1974 |
| GB | 2 061 313 | 5/1981 |
| GB | 2 061 996 | 5/1981 |
| GB | 2 389 123 | 12/2003 |

OTHER PUBLICATIONS

Co-pending application for: Abbas et al.; U.S. Appl. No. 12/595,700, filed Feb 8. 2010, entitled: Self Adhesive Hard Surface Cleaning Block.

PCT International Search Report on International Application No. PCT/EP2008/053637 dated Jul. 4, 2008.

European Search Report on Application No. EP 07 10 6225 dated Sep. 7, 2007.

PCT International Search Report on International Application No. PCT/EP2008/053023 dated Jul. 4, 2008.

European Search Report on Application No. EP 07 10 6224 dated Sep. 10, 2007.

PCT International Search Report on International Application No. PCT/EP2008/053463 dated Jul. 4, 2008.

European Search Report on Application No. EP 07 10 6223 dated Sep. 10, 2007.

* cited by examiner

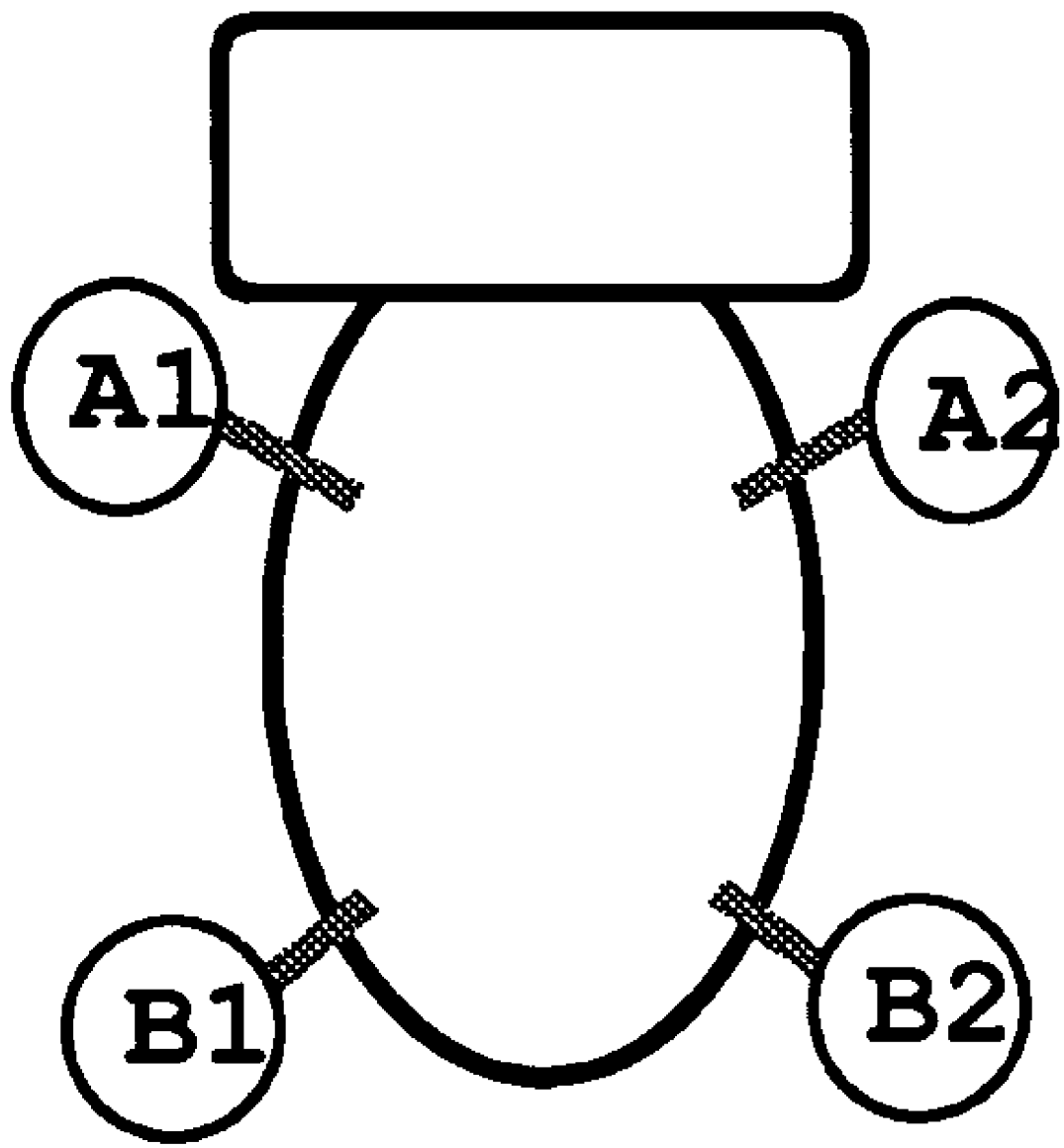

SELF ADHESIVE HARD SURFACE CLEANING COMPOSITION

FIELD OF THE INVENTION

The present invention relates to hard surface cleaning compositions, and their use.

BACKGROUND PRIOR ART

Hard surface cleaning blocks, such as lavatory blocks are known in the art and are typically configured to provide an automatic and sustained release of active ingredients to a liquid passing the block and/or the release of perfume to the air. For example, they may be suspended in a container under the rim of a lavatory bowl or urinal such that, during a flushing cycle, water from the cistern flows over the block thereby dissolving a portion of the block and releasing active ingredients of the block into the lavatory bowl. They may also be used inside a dish washing machine or even for the purpose of manual dishwashing.

Different means of applying blocks to a toilet have been disclosed in the art. Holders for solid detergent blocks are for instance disclosed in EP-B1-586 137. An alternative to the lavatory block is a liquid dispenser device, such as the device disclosed in GB2389123.

Both the liquid and the solid rim device require a holder connecting the lavatory block to the toilet rim. Present day consumers do not like the idea of having to touch and handle a device that has been in the toilet for weeks, when refilling or replacement is required. Due to environmental reasons, disposal of such devices is also not appreciated by the consumers.

Attempts have been made to solve this problem, by various means. One such alternative is a tablet for use in the water cistern. However, this kind of device cannot be used in built-in water cisterns that are becoming more and more popular. Another alternative is a pump device having a dispenser at the toilet rim and a separate bottle with cleaning liquid outside the toilet. This option has the disadvantage of a tube connecting the rim device to the bottle with cleaning liquid.

Hard surface cleaning blocks in different forms are disclosed in the art. Solid blocks in a holder are for instance disclosed in EP-B1 553 162. An alternative to the solid block is a liquid dispenser device, such as the device disclosed in GB2389123. The hard surface cleaning composition can even be applied directly onto the surface as disclosed in EP-A1-1 086 199, where a self adhesive paste is disclosed. Alternatively, co-pending European application nr 06124234.3, discloses a detergent composition comprising an adhesive phase.

In these and other hard surface cleaning blocks, the delivery of perfume to a room is the main objective.

Hard surface cleaning blocks optionally comprising biocide are disclosed in the art. However, to be able to dose an effective amount of biocide to provide hygiene from a small hard surface cleaning block over a large number of flushes, requires a high level of biocide. A hard surface cleaning block comprising such a biocide compound in such effective amount to provide hygiene to a hard surface, in particular to a toilet bowl, remains to be desired.

U.S. Pat. No. 6,667,287 discloses a light duty liquid cleaning composition comprising a biocide (benzalkonium chloride) for providing hygiene to a toilet.

A hard surface cleaning composition that can be easily positioned on a hard surface, and effectively providing hygiene to a toilet, remains to be desired.

It is an object of the present invention to provide a hard surface cleaning composition providing hygiene to a hard surface.

It is an object of the present invention to provide a detergent composition that can be easily positioned onto a hard surface; even a wet surface.

It is a further object of the invention to provide a hard surface cleaning composition that rinses away in a number of flushes, releases a hygiene agent at a uniform rate, and does not leave behind any residue that cannot be easily removed with e.g. a toilet brush.

It is a further object of the invention to provide such a composition in a solid or semi solid form.

We have surprisingly found that a hard surface cleaning composition comprising biocide meets at least one of these objects.

SUMMARY OF THE INVENTION

Accordingly, the invention provides a hard surface cleaning composition, which is at least partially transparent or translucent, characterized in that it comprises: 30 to 80% by weight of a surfactant system forming a liquid crystalline phase in presence of water and 20 to 50% by weight of biocide material.

The invention further provides a method for providing hygiene to a toilet.

The invention also provides a method for manufacturing the hard surface cleaning composition of the invention.

These and other aspects, features and advantages will become apparent to those of ordinary skill in the art from a reading of the following detailed description and the appended claims. For the avoidance of doubt, any feature of one aspect of the present invention may be utilised in any other aspect of the invention. It is noted that the examples given in the description below are intended to clarify the invention and are not intended to limit the invention to those examples per se. Similarly, all percentages are weight/weight percentages unless otherwise indicated. Numerical ranges expressed in the format "from x to y" are understood to include x and y. When for a specific feature multiple preferred ranges are described in the format "from x to y", it is understood that all ranges combining the different endpoints are also contemplated.

DETAILED DESCRIPTION OF THE INVENTION

The hard surface cleaning composition according to the invention comprises a surfactant system forming a crystalline phase in contact with water; and biocide material. The invention relates to the formulation and process for making a self sticking composition which may be used directly to stick on a hard surface. The self sticking behaviour is due to the formation of liquid crystalline phase in presence of water.

Said liquid crystalline phases have different rheological properties. In the present invention the phase transition behaviour of the composition in presence of water provides a way to stick the composition in toilet, thus providing a self adhesive system. It has been found that cubic and hexagonal phases have good adhesion properties and have got very high viscosity. It is possible to have lamellar liquid crystalline phase in the composition which in contact with water forms hexagonal phase and gives adhesion properties to the composition, thus providing the possibility to attach the composition to a wet surface.

This is achieved by providing a composition that gradually erodes or dissolves when contacted or flushed with water, thereby gradually releasing active ingredients to the toilet.

One of the possible uses of the hard surface cleaning composition according to the invention is its application in a toilet. Toilet compositions preferably last for at least 50, more preferably at least 100, still more preferably at least 200, or even more than 250 flushes.

Toilet compositions generally do not last for more than 500 flushes, more preferably not more than 400 flushes and most preferably not more than 350 flushes.

The hard surface cleaning composition of the invention may be a solid, semi-solid or gel like composition in the meaning of Römpp Lexicon Chemie, 10$^{th}$ edition, Stuttgart/New York, 1997.

Surfactant System

The surfactant system according to the invention forms liquid crystalline phases in contact with water. These liquid crystalline phases have different rheological properties. Some of these phases such as hexagonal and cubic phase have very good adhesion properties.

Non ionic surfactants alone or in combination with small quantity of anionic surfactants give suitable foaming and adhesion properties to the product. The non ionic surfactants may be selected from the group of fatty alcohol ethoxylate. Alternatively polysorbate nonionic surfactants may also be used. More preferably the polysorbate is a short chain (C10-C12, saturated or unsaturated) polysorbate, such as Tween 20, or longer chain (up to C18, unsaturated) polysorbate, such as Tween 80. Polysorbate nonionic surfactants are found to have excellent foaming properties.

C8-C12 fatty alcohol ethoxylates with 5-10 ethylene oxide groups facilitate the formation of liquid crystalline phase during the contact with water and further improve the foaming properties of the composition.

To further improve the structuring of the product, long chain fatty alcohol ethoxylates with a high melting point and lower solubility may be used. The fatty alcohol ethoxylates with melting point between 45 to 65° C. are the most suitable ethoxylates as structurants.

The hardness and the rheological properties of the product may be adjusted by selecting the proper ratio of the different fatty alcohol ethoxylates. The most promising results have been found by using 0-15% C10-C12 fatty alcohol ethoxylates, preferably from 2-10% and most preferably from 4-6%.

The higher chain fatty alcohol ethoxylates, when present in the composition are selected from the group of ethoxylates having C14 to C24 fatty alcohols with 15 to 60 ethylene oxide (EO) groups, preferably 15 to 35 EO, more preferably 20 to 30 EO. A more preferred chain length is C16 to C22.

Anionic and amphoteric surfactants may also be present in the surfactant system. The anionic and amphoteric surfactants form liquid crystalline phases above the Krafft point. These liquid crystalline phases provide the adhesion properties of the composition to the hard surface.

Anionic and amphoteric surfactants with a Krafft Point below room temperature are suitable for this application. Anionic surfactants such as alfa olefin sulfonate, sodium lauryl ether sulphate and sodium lauryl sulphate are suitable for this application. CMEA, CDEA and the amphoteric surfactants such as CAP Betaine may also be used to get similar result. These surfactants can be used in the formulation at a level of 0-10%, more preferably 2-5% by weight. Higher levels have been observed to give a softer product.

The surfactant forming a liquid crystalline phase in the presence of water is present in the composition in a concentration of at least 30%, preferably at least 40%, more preferably at least 60%. The surfactant is present the composition in a concentration of not more than 80%, preferably not more than 75%.

Biocide Material

The biocide material is selected from quaternary ammonium based biocides. Examples of such quaternary ammonium biocides are CTAC (cetyl trimethyl ammonium chloride), and BAC (benzalkonium chloride). BAC is the most preferred. These quarternary ammonium biocides with different chain lengths have been found to give different hygiene properties. Surprisingly it has been observed that the hygienic properties of a quaternary ammonium biocide having at least one alkyl chain with a length of at least 12 carbon atoms (C12) show a better biocidal effect than the quaternary ammonium biocides having a shorter chain. The preferred chain length is C14-C16, more preferably a mixture of C14-C16, with 80-98% w of C14.

The biocide is preferably present in a concentration of at least 20%. The biocide is present in a concentration of up to 50%. Due to safety restrictions, some biocides may only be present in a concentration of less than 25%.

Adhesive Layer Material

To further improve the adhesion of the composition to the hard surface, an adhesive layer between the composition of the invention and the hard surface may be used. Such adhesive layer is particularly suitable for hard solid blocks having penetration value of 1-4 mm. Such an adhesive layer is preferably between 0.01 and 0.2 mm thick.

Suitable adhesive layers are disclosed in co-pending European application EP06124234.

The adhesive phase comprises a hydrophobic adhesive material and optionally a hydrophilic adhesive material. The hydrophobic adhesive material is required for the invention to obtain suitable resistance to water. To obtain even stronger adhesion, the composition may further comprise a hydrophilic adhesive material.

The hydrophobic adhesive material comprises at least one of a hydrophobic compound with an aggregate melting point of 30 to 60° C., preferably 45 to 55° C. and a polymer. The hydrophobic compound is present in the hydrophobic adhesive material in a concentration of 25-60%, preferably 35-55%, more preferably 40-50% by weight based the hydrophobic adhesive material. The adhesive phase further comprises a polymer in a concentration of 5-75%, preferably 20-70%, more preferably 40-65%, most preferably 50-60% by weight based on the hydrophobic adhesive material.

The hydrophobic compound is preferably selected from natural or mineral oils, petrolatum, thickened oils, partially hydrogenated oils or fats, silicon oils and derivatives, thickened non polar solvent or low HLB non ionic surfactant and combinations thereof. Low HLB as defined herein means preferably less than 12, more preferably less than 10.

The polymer is preferably selected from natural and synthetic cellulosic polymers, such as carboxymethyl cellulose, polyacrylates, polyvinyl pyrolidone, maleic/vinyl copolymers, silicon based polymers and mixtures thereof.

The polymers in the hydrophobic adhesive material are preferably water insoluble and preferably swell in contact with water.

The adhesive phase optionally comprises a hydrophilic adhesive material. To prevent instant dissolution of the hydrophilic adhesive phase upon contact with water, the hydrophilic adhesive material, if present, is preferably positioned in such a way that it is connected to both the hard surface and the detergent phase or an intermediate phase between the detergent phase and the adhesive phase, while it is surrounded by the hydrophobic adhesive material on all other sides. Even though one would expect the hydrophilic adhesive material to be quickly dissolved by water, it is postulated, without wishing to be bound by a theory, that it is possible to obtain said further improved adhesion by the combination of hydrophobic adhesive material surrounding hydrophilic adhesive material, because the hydrophobic adhesive material stops the penetration of water while the hydrophilic adhesion material further improves the adhesive strength to the block.

The hydrophilic adhesive phase is preferably selected from starch based adhesive materials, hydrophilic polymers, fatty acid salts and/or mixtures thereof. One example of such a hydrophilic adhesive is a mixture comprising PVP polymer and sodium stearate.

The hydrophilic adhesive material is present in an amount of 0-60% by weight of the total adhesive phase. Preferably the ratio of hydrophobic:hydrophilic adhesive material is between 10:1 and 1:10, more preferably, between 5:1 and 1:5, still more preferably 4:1 and 1:2, most preferably between 2:1 and 1:1.

Either one or both of the adhesive materials may further comprise a suitable rheology modifier. Preferably, the rheology modifier is present in a concentration of 0-10%. Polymeric thickeners are an example of suitable rheology modifiers for fumed silica or silica oil; hydrogenated triglycerides or fatty acids are an example of suitable rheology modifiers for fatty acids and triglycerided; and an example of a suitable rheology modifier for anhydrous, hydrophobic oils is 12-Hydroxy stearic acid.

Optional Ingredients

The hard surface cleaning composition according to the invention may further comprise detergent active, builders, dyes, perfume, hygiene agents, antioxidants, radical scavengers, chelating agents, hydrotropes, anticorrosion agents, opacifiers, brighteners, preservatives and/or abrasives such as silica, kaolin, talc etc. However, further ingredient that compromise the transparent or translucent character of the composition are not preferred.

Suitable detergent active are e.g. described in "Surface Active Agents" Vol. 1, by Schwartz & Perry, Interscience 1949, Vol. 2 by Schwartz, Perry & Berch, Interscience 1958, in the current edition of "McCutcheon's Emulsifiers and Detergents" published by Manufacturing Confectioners Company or in "Tenside-Taschenbuch", H. Stache, 2nd Edn., Carl Hauser Verlag, 1981.

The composition may optionally comprise humectant. Humectants maintain both structure and clarity, enabling salvation of the soap chains/ribbons to maintain microcrystalline domains. If these domains are kept small and prevent further crystal nucleation, then the resultant structure is transparent. Preferred humectants are polyhydroxylated organic compounds, such as sorbitol and sucrose.

The humectant may be present in a concentration of 0 to 40% by weight of the composition. The humectant is preferably present in a concentration of at least 5%, but preferably not more than 20%, more preferably not more than 10%.

Solvents may also be present in the composition. Preferred solvents include glycols, (e.g. monopropylene glycol/propane-1,2-diol), poly alkylene glycols (e.g. PEG, PPG), water and short chain organic solvents (e.g. ethanol or isopropanol) and perfumes.

The solvent may be present in the composition in a concentration of 0 to 10%, preferably 1-10% by weight of the composition.

The composition may comprise small quantities of long chain fatty acids, fatty alcohols, fatty esters to further structure the system to prevent the dripping of liquid crystalline phase after frequent flushes.

High molecular weight PEGs having melting point more that 40 C may be used as further structurants for these types of blocks. The preferred melting point is in the range of 50-60 C.

Composition Size and Shape

The shape of the hard surface cleaning composition may affect its adhesive properties. It is preferred to have hydrodynamic shapes, which help in better control of the erosion properties of the block which in turn helps in better adhesion to the surface. Thus, round, smooth shapes are preferred over square/rectangular blocks with sharp edges, due to superior hydrodynamic behavior.

The composition life is directly related to its formulation and the size. A normal size toilet block is between 10 and 50 grams, preferably about 15 to 40 gm and most preferably about 20-25 gm.

It has been found that hard surface cleaning blocks with a high biocide concentration do not have an attractive appearance. Biocide precipitates generally make the block inhomogeneous. It is therefore an object to provide an block that is at least partially transparent or translucent. By at least partially transparent or translucent is meant that a 1 cm thick sample of the material transmits at least 5% of visible light, preferably at least 20% of visible light, more preferably at least 50% of visible light. More preferably the block is transparent. By transparent is meant that a 1 cm thick sample of the block transmits at least 70% of visible light, preferably at least 90%. Due to the presence of a dye, and almost inevitable absorption and/or scattering of some of the light, the transmission is generally below 95% of visible light.

Application

The composition of the invention may be applied to the surface from a tube or in a preformed shape. The composition may for instance be used for toilet cleaning, manual dish washing and machine dish washing.

A method for attaching the material directly onto the toilet bowl surface comprising the step of attaching the composition to a wet toilet bowl surface. In this method a liquid crystalline phase is formed on the area of the composition that comes in contact with the water on the wet bowl surface, thus providing adhesion.

In a preferred embodiment, a method for providing hygiene to a toilet is provided. In that method a hard surface cleaning composition according to the invention attached to the toilet bowl surface. The toilet is flushed, thereby wetting the composition and dissolving a small portion of the composition in the flush water, preferably about 0.01% to 1.0% by weight, preferably 0.1% to 0.5%.

Hardness of the Composition

The hard surface cleaning composition of the invention may be a solid, semi-solid or gel like composition in the meaning of Römpp Lexicon Chemie, $10^{th}$ edition, Stuttgart/New York, 1997

The preferred hardness of the composition is dependent on its purpose. In the context of this invention, the composition hardness is measured by the method given below.

The composition hardness may be analysed using a Penetrometer PNR10 (ex SUR Berlin). The method involves using a probe to mechanically penetrate the sample of interest using a known force. The penetrometer needle is positioned manually close to the surface of sample under test and impact measurement carried out. The result is displayed in 'mm' penetration depth into the sample and replicate readings carried out on a different part of the composition. Low values correlate to hard samples, while higher values correspond to softer materials.

Suitable composition can range from hard to very soft gels in a range of 1 to 19 mm penetration measured using the method above.

For gels to be squirted from a tube, a hardness of 12 to 19 mm penetration is preferred.

For a composition to be used in a cage, for instance a cage holding a toilet rim composition, a hardness of 1 to 11 mm penetration is preferred.

For a composition that is adhered straight onto the toilet surface, e.g. by means of an adhesive layer attached to one side of the composition, a somewhat flexible composition, with a hardness of about 1 to 14 mm penetration, more preferably 1 to 12 mm, most preferably 1-9 mm is preferred.

Process for Manufacturing

The invention provides a method for the manufacturing of blocks comprising the composition of the invention, comprising the steps of:

heating the surfactant system to 60 to 90° C., preferably about 80° C., adding the biocide in the homogeneous liquid, and fully dissolve the biocide, cooling the mass to about 60-65° C., optionally adding perfume and colour ingredients at this temperature, and pouring the melt in a mould of a desired shape.

The product in the mould may be kept at room temperature for solidification or it may be passed through a cooling tunnel for quick solidification. Once the product is solidified in the mould it may be packed in any desired packaging.

Depending upon the formulation, it is also possible to use injection moulding or normal conventional extrusion process to make these blocks.

EXAMPLES

The invention is now illustrated by means of the following non limiting examples.

Example 1

Adhesion Properties

Adhesion properties and the product attributes of the following formula was tested in the toilet by applying about 0.1-0.15 mm thick layer of the adhesive. The results are described in the following table. Toilet block were made from composition 1 (below).

| Ingredients | Composition 1 (%) |
|---|---|
| Benzalkonium Chloride | 23.5 |
| C8-C10 Fatty Alcohol Ethoxylate | 7.00 |
| C16-C18 Fatty Alcohol Ethoxylate | 54.5 |
| C22 Fatty Alcohol Ethoxylate | 10.00 |
| Perfume | 4.00 |

The blocks are positioned in different types of toilets at a position where the force of water is maximum. The different positions are indicated in FIG. 1. The result of the study in the toilet are given in the table below.

TABLE 1

Adhesion results.

| Toilet NO. | Toilet Type | No of Flushes and Block Position in Toilet | | | |
|---|---|---|---|---|---|
| | | A1 | A2 | B1 | B2 |
| 1 | Villeroy & Boch | | | 141 | 50 |
| 2 | Villeroy & Boch | | | >200 | >200 |
| 3 | Villeroy & Boch | | | >200 | >200 |
| 4 | Villeroy & Boch | | | >200 | >200 |
| 5 | Villeroy & Boch | | | >200 | >200 |
| 6 | Villeroy & Boch | | | >200 | >200 |
| 7 | Villeroy & Boch | | | >200 | >200 |
| 8 | Villeroy & Boch | | | >200 | >200 |
| 9 | Villeroy & Boch | | | >200 | >200 |
| 10 | Villeroy & Boch | | | >200 | >200 |
| 11 | Ideal Standard | >200 | >200 | >200 | >200 |
| 12 | Ideal Standard | >200 | >200 | >200 | >200 |
| 13 | Armitage & Shank | >200 | >200 | >200 | >200 |
| 14 | Armitage & Shank | >200 | >200 | >200 | >200 |
| 15 | Kolo | >200 | >200 | >200 | >200 |
| 16 | Kolo | >200 | >200 | >200 | >200 |

The result indicates that most of the blocks survive for more than 200 flushes. Erosion behaviour and the foaming properties of the block is found to be very good.

The same block was tested for its biocidal activity in comparison to the leading solid blocks in the market. It has been found that 3-10 ppm of benzalkonium chloride is sufficient to kill dangerous bacteria such as *E Coli* while there was no effect of non bleach blocks on the biocidal activity.

Example 2

Performance Lasting

The compositions of this example were tested for the number of flushes they lasted while maintaining the right product dosing to a toilet.

TABLE 2

Non Soap formulations using non ionic surfactants.

| | 2 | 3 | 4 | 5 | 6 | 7 |
|---|---|---|---|---|---|---|
| Benzalconium Chloride | 23.5 | 23.5 | 23.5 | 20.0 | 23.5 | 30.0 |
| C16-C18 Fatty alcohol 25 EO | 56.5 | 59.5 | 52.5 | 42.0 | 45.5 | 47.0 |
| C9-C11 Fatty alcohol 8EO | 6 | 6 | 6 | 3.0 | 6 | 6 |
| C20-C22 Fatty alcohol 30 EO | 10 | 0 | 8 | 25.0 | 10 | 10 |
| Perfume | 4 | 4 | 8 | 10 | 8 | 5 |
| C20-22 fatty alcohol | 0 | 5 | 0 | 0 | 5 | 0 |

TABLE 2-continued

Non Soap formulations using non ionic surfactants.

|  | 2 | 3 | 4 | 5 | 6 | 7 |
|---|---|---|---|---|---|---|
| PEG 6000 | 0 | 2 | 0 | 0 | 2 | 0 |
| Alkyl Poly Glucoside | 0 | 0 | 2 | 0 | 0 | 2 |
| Total | 100 | 100 | 100 | 100 | 100 | 100 |
| No. of Flushes | 300 | 160 | 160 | >150 | >150 | >150 |

As can be seen in these examples, the blocks in various compositions last for at least 150 flushes and up to 300 flushes.

Example 3

Hygiene Efficacy

The anti bacterial effect of the compositions according to the invention is demonstrated in this example.

A suitable method was devised for testing the efficacy of experimental toilet blocks under realistic conditions. This method uses a low level of bacteria and no additional soiling as the bulk of bacteria and soil are removed from the toilet during the flush and the purpose of the toilet block is to deliver a maintenance dose to control residual bacteria.

Description of Method

The method below describes how to test for inherent performance from a fragment of block equivalent to the amount lost in a flush. This amount is calculated from block weight/flush lifetime and in this case is 30 g/300 flushes which equal 0.1 g per flush. A stock solution of the block to be tested is prepared in sterile water of standard hardness (as specified in EN1276) then a series of dilutions of this stock solution are prepared so as to give a set of final dilutions of ranging from 1 in 1000 to 1 in 50,000. At time zero each of these dilutions is mixed 1 to 1 with an inoculum of the test bacteria standardized to give a count of $2.0 \times 10^3$ bacteria/ml–$5.0 \times 10^3$ bacteria/ml and left for a contact time of 1 and 4 hours, this gives a final "in-test" dilution range of 1 in 2000 to 1 in 100,000. A suitable bacteria for use in this test is *E. coli* (ATCC 10536). After the desired contact time a sample of each test solution is removed and diluted 1 in 10 in an appropriate neutralizer solution, such as universal neutralizer as described in EN1276, which has been supplemented with tryptone soy broth to allow outgrowth of surviving bacteria.

Effective block performance is measured as the highest dilution showing no growth, in 75% of test samples, of bacteria after 24 hours incubation at 37° C.

Example Toilet block formulations tested are given in the table below along with the dilutions achieving a pass after 1 and 4 hours contact time with *E. coli*.

| Ingredients (%) by weight | 8 | 9 | 10 | 11 |
|---|---|---|---|---|
| Prisavon 2013 soap (uniqema) | 0 | 0 | 0 | 58.5 |
| 85/15 short/long chain soap | 0 | 0 | 40 | 0 |
| Benzalkonium Chloride | 50 | 50 | 25 | 36.9 |
| C16-C18 FA Ethoxylate | 40 | 0 | 0 | 0 |
| Alfa Olefine Sulfonate | 10 | 10 | 0 | 4.6 |
| Lutensol AT25 | 0 | 40 | 0 | 0 |
| Propylene Glycol | 0 | 0 | 10 | 0 |
| Ethanol | 0 | 0 | 5 | 0 |
| Fragrance | 0 | 0 | 5 | 0 |
| Glycerine | 0 | 0 | 5 | 0 |
| Effective dilution (1 Hr) | 46,000 | 55,000 | 9,000 | 27,000 |
| Effective dilution (4 Hr) | >60,000 | >60,000 | 58,000 | Not tested |

Balance of formulations is water.

As can be seen from the results the compositions of the invention show full inhibition at a dilution of more than 1:50000 and 4 hours contact time. The compositions 8 and 9 also show inhibition at a dilution of about 1:50000 at 1 hour contact time.

The invention claimed is:

1. A hard surface cleaning composition suitable for application to a toilet surface, said composition comprising:
    a. 30 to 80% by weight of a surfactant system forming a liquid crystalline phase in the presence of water, said surfactant system comprising a mixture of a C8-C12 fatty alcohol ethoxylate having 5-10 ethylene oxide and a C14 to C24 fatty alcohol ethoxylate having 15 to 35 ethylene oxide:
    b. 20 to 50% by weight of a quaternary ammonium biocide;
    wherein the composition contains no more than 10% of anionic and amphoteric surfactants, and wherein a 1 cm thick sample of the composition transmits at least 50% of visible light.

2. A hard surface cleaning composition according to claim 1, wherein the composition further comprises an adhesive layer, wherein the adhesive layer comprises a hydrophobic adhesive material comprising:
    a. 25-60% of at least one hydrophobic compound, having an aggregate melting point of 30-60° C.; and
    b. 5-75% of a polymer.

3. A composition according to claim 1, wherein the quaternary ammonium biocide is benzalkonium chloride.

4. A composition according to claim 1, wherein the surfactant system comprises a C8-C12 fatty alcohol ethoxylate having 5-10 ethylene oxide and a C16 to C22 fatty alcohol ethoxylate having 20 to 35 ethylene oxide.

5. A composition according to claim 1, wherein the surfactant system comprises an anionic or amphoteric surfactant, having a Krafft point below room temperature.

6. A composition according to claim 1, wherein the hardness is 1-12 mm.

7. Process for the manufacture of a composition according to claim 1, comprising the steps of:
    a. Melting all the surfactant system at a temperature of 60-90°;
    b. Dissolving the biocide in the molten surfactant system; and
    c. Pouring the melt into moulds to solidify.

8. Method for providing hygiene in a toilet comprising the steps of:
    a. Applying the composition according to claim 1 to the toilet surface.
    b. Flushing the toilet with water.

9. A composition according to claim 1, wherein a 1 cm thick sample of the composition transmits at least 70% of visible light.

10. A composition according to claim 1, wherein a 1 cm thick sample of the composition transmits at least 90% of visible light.

11. A composition according to claim 1, wherein the composition contains no more than 5% of anionic and amphoteric surfactants.

* * * * *